United States Patent
Marshall et al.

(10) Patent No.: US 6,460,319 B2
(45) Date of Patent: Oct. 8, 2002

(54) VEGETATION TRIMMING AND EDGING DEVICE WITH ADJUSTABLE HEAD ORIENTATION

(75) Inventors: James D. Marshall, Mallorytown; Michael Milligan, Seeleys Bay; Iulian Bejan, Brockville, all of (CA)

(73) Assignee: Black & Decker Inc., Towson, MD (US)

(*) Notice: Subject to any disclaimer, the term of this patent is extended or adjusted under 35 U.S.C. 154(b) by 0 days.

(21) Appl. No.: 09/797,063

(22) Filed: Mar. 1, 2001

(65) Prior Publication Data

US 2001/0034940 A1 Nov. 1, 2001

Related U.S. Application Data

(62) Division of application No. 09/353,693, filed on Jul. 14, 1999, now Pat. No. 6,301,866.

(51) Int. Cl.[7] .............................................. A01D 50/00
(52) U.S. Cl. ........................... 56/233; 56/249; 172/13; 172/41; 172/753; 172/776
(58) Field of Search .................. 56/249, 249.5, 56/233; 172/13, 14, 245, 41, 42, 371, 372, 681, 683, 749, 750, 751, 753, 776

(56) References Cited

U.S. PATENT DOCUMENTS

| 3,221,481 A | 12/1965 | Mattson et al. | |
|---|---|---|---|
| 3,330,102 A | 7/1967 | Shuman, Jr. | |
| 3,350,864 A | 11/1967 | Sheps et al. | |
| 3,561,199 A | 2/1971 | Lay | |
| 3,803,819 A | 4/1974 | Ehrlich | 56/17.1 |
| 4,043,101 A | 8/1977 | Lahr et al. | 56/17.1 |
| 4,052,789 A | 10/1977 | Ballas, Sr. | 30/276 |
| 4,463,498 A | 8/1984 | Everts | 56/17.1 X |
| 4,762,033 A * | 8/1988 | Chow | 81/63.2 |
| 4,777,858 A * | 10/1988 | Petschulat et al. | 84/314 R |
| 5,279,569 A * | 1/1994 | Neer et al. | 604/154 |
| 5,594,990 A | 1/1997 | Brant et al. | 174/14 X |
| 5,603,205 A | 2/1997 | Foster | 56/16.7 |
| 5,662,428 A | 9/1997 | Wilson | 172/13 X |
| 5,704,408 A * | 1/1998 | Law | 141/198 |
| 5,815,928 A | 10/1998 | Cline | 172/13 X |

FOREIGN PATENT DOCUMENTS

| DE | 296 03 934 U1 | 6/1996 |
|---|---|---|
| EP | 0 653 364 A2 | 5/1995 |
| EP | 0 703 044 A1 | 3/1996 |
| GB | 2 297 020 | 7/1996 |
| WO | WO 96/25843 | 8/1996 |
| WO | WO 97/31520 | 9/1997 |

OTHER PUBLICATIONS

Black and Decker world wide web product page, "12 Bump Feed 3.5A String Trimmer," Model ST4000 (Apr. 1, 1999).
Black and Decker world wide web product page, "Cordless Automatic Feed Trimmer/Edger Ground Hog," Model CST1000 (Apr. 1, 1999).

* cited by examiner

*Primary Examiner*—Christopher J. Novosad
(74) *Attorney, Agent, or Firm*—Fish & Richardson, P.C., P.A.

(57) ABSTRACT

A vegetation trimming and edging device has an adjustable head that permits selective positioning between trimming and edging orientations. A shaft extends between the head and a handle. The head receives one end of the shaft. A coupling mechanism couples the head and shaft, and locks the head against rotational movement about the shaft. In particular, the coupling mechanism includes a locking structure and a bias mechanism. The bias mechanism urges the locking structure into engagement to prevent rotational movement of the head. Downward pressure applied to the head overcomes the bias, however, and disengages the locking mechanism for rotation of the head between trimming and edging modes. When the downward pressure is released, the locking mechanism is again engaged to lock the head in position for the desired operational mode.

15 Claims, 11 Drawing Sheets

VEGETATION TRIMMING AND EDGING DEVICE WITH ADJUSTABLE HEAD ORIENTATION

This is a divisional application of U.S. application Ser. No. 09/353,693, filed Jul. 14, 1999, now U.S. Pat. No. 6,301,866.

TECHNICAL FIELD

The present invention relates generally to vegetation trimming and edging devices and, more particularly, to mechanisms for adjustment between trimming and edging modes.

BACKGROUND

Many vegetation trimming and edging devices make use of a cutting element, such as a plastic string, that is rotated at high speed to cut vegetation such as grass or weeds. Trimming generally refers to the cutting of vegetation in a substantially horizontal swath. Edging generally refers to the cutting of vegetation with a substantially vertical swath to produce a more precise edge, e.g., for defining the border of a lawn adjacent a driveway or sidewalk.

The user adjusts the cutting device between horizontal and vertical orientations for trimming or edging. Physically tilting the cutting device to the proper orientation can be awkward, however, and cause muscle strain. For this reason, many cutting devices offer an adjustable working member, or "head," that can be manipulated between the trimming and edging positions.

The head is mounted at the end of a shaft that extends from the head to a handle that is gripped by the user. The head typically contains a motor and a rotor to which the cutting element is attached. The handle includes a switch for actuation of the motor. By rotating the head about the shaft, the user can adjust the orientation of the cutting element, but maintain the orientation of the handle gripped by the user.

SUMMARY

The present invention is directed to a vegetation trimming and edging device having an adjustable head that permits selective positioning between trimming and edging orientations. A shaft extends between the head and a handle. The head receives one end of the shaft. A coupling mechanism couples the head and shaft, and locks the head against rotational movement about the shaft. In particular, the coupling mechanism includes a locking structure and a bias mechanism.

The bias mechanism urges the locking structure into engagement to prevent rotational movement of the head. Downward pressure applied to the head overcomes the bias, however, and disengages the locking mechanism for rotation of the head between trimming and edging modes. When the downward pressure is released, the locking mechanism is again engaged to lock the head in position for the desired operational mode.

In some embodiments, the coupling mechanism faciliates a "push-and-turn" operation in which the head is forced downward against a bias, and then rotated to a rotational position appropriate for trimming or edging. This "push-and-turn" arrangement reduces the possibility that the head will unexpectedly rotate during use, as could occur with a "pull-and-turn" arrangement in which upward movement of the head permits rotation. In particular, contact of the head with the ground and resulting upward movement is less likely to cause rotation. This may be particularly advantageous for bump-feed devices.

In other embodiments, the coupling mechanism may include a locking collar that can be moved upward to free the head for rotational movement between trimming and edging positions. For this arrangement, axial movement of the head is unecessary for rotation. Thus, unlike a pull-and-turn arrangement, upward movement of the head is unlikely to cause unexpected rotational movement. Instead, the locking collar generally requires manual intervention to permit rotation of the head, thereby resisting rotation due to head-ground contact.

In one embodiment, the present invention provides a vegetation trimming and edging device comprising a cutting element, a motor that drives the cutting element, a head that supports the motor and the cutting element, a handle, a shaft extending between the head and the handle, and a coupling mechanism that couples the shaft to the head, the coupling mechanism including an opening defined by the head for receipt of the shaft, a structure extending from one of the head and the shaft, a track defined by one of the head and the shaft, the track extending in a substantially circumferential direction relative to the shaft, wherein the structure travels along the track during rotation of the head about a longitudinal axis defined by the shaft, a first slot defined by the track for receipt of the structure at a first rotational position of the head appropriate for edging operation, a second slot defined by the track for receipt of the structure at a second rotational position of the head appropriate for trimming operation, and a bias mechanism that biases the structure into engagement with the first slot upon rotation of the head into the first rotational position, and biases the structure into engagement with the second slot upon rotation of the head into the second rotational position, whereby one of the first and second slots locks the head against rotation, and the head is rotatable between the first and second rotational positions upon movement of the structure against the bias and out of engagement with the respective slot.

In another embodiment, the present invention provides a coupling mechanism for coupling a shaft to a head in a vegetation trimming and edging device, the coupling mechanism comprising an opening defined by the head for receipt of the shaft, a structure extending from one of the head and the shaft, a track defined by one of the head and the shaft, the track extending in a substantially circumferential direction relative to the shaft, wherein the structure travels along the track during rotation of the head about a longitudinal axis defined by the shaft, a first slot defined by the track for receipt of the structure at a first rotational position of the head appropriate for edging operation, a second slot defined by the track for receipt of the structure at a second rotational position of the head appropriate for trimming operation, and a bias mechanism that biases the structure into engagement with the first slot upon rotation of the head into the first rotational position, and biases the structure into engagement with the second slot upon rotation of the head into the second rotational position, whereby one of the first and second slots locks the head against rotation, the head being rotatable between the first and second rotational positions upon movement of the structure against the bias and out of engagement with the respective slot.

In a further embodiment, the present invention provides a vegetation trimming and edging device comprising a head that supports a cutting element, a shaft mounted in an opening defined by the head, a structure extending from one of the head and the shaft, a track defined by one of the head and the shaft opposite the structure, the structure traveling along the track upon rotation of the head, first and second slots formed at different positions along the track, and a mechanism that urges the structure into one of the first and second slots to thereby lock the head against rotation.

In an added embodiment, the present invention provides a coupling mechanism for coupling a shaft to a head in a vegetation trimming and edging device, the coupling mechanism comprising a structure extending from one of the head and the shaft, a track defined by one of the head and the shaft opposite the structure, the structure traveling along the track upon rotation of the head, first and second slots formed at different positions along the track, and a mechanism that urges the structure into one of the first and second slots.

In another embodiment, the present invention provides a vegetation trimming and edging device comprising a cutting element, a motor that drives the cutting element, a head that supports the motor and the cutting element, a handle, a shaft extending between the head and the handle, and a coupling mechanism that couples the shaft to the head, the coupling mechanism including a neck portion defined by the head for receipt of the shaft, a collar mounted about the neck portion and about a portion of the shaft proximate the neck portion, the neck portion and collar having a keyed structure such that the collar and neck portion are jointly rotatable about the shaft, a structure extending from one of an exterior surface of the shaft and an interior surface of the collar, a slot defined by one of the collar and the shaft for engagement with the structure to lock the collar and neck portion against rotation about the shaft, and a bias mechanism that biases the structure and slot into engagement with one another upon rotation of the collar and head to a first rotational position, the structure and the slot lock the collar and the head against rotation, the head being rotatable between the first and second rotational positions upon movement of the collar against the bias to disengage the structure and slot.

In a further embodiment, the present invention provides a coupling mechanism for coupling a shaft to a head in a vegetation trimming and edging device, the coupling mechanism comprising a neck portion defined by the head for receipt of the shaft, a collar mounted about the neck portion and about a portion of the shaft proximate the neck portion, the neck portion and collar having a keyed structure such that the collar and neck portion are jointly rotatable about the shaft, a structure extending from one of an exterior surface of the shaft and an interior surface of the collar, a slot defined by one of the collar and the shaft for engagement with the structure to lock the collar and neck portion against rotation about the shaft, and a bias mechanism that biases the structure and slot into engagement with one another upon rotation of the collar and head to a first rotational position, the structure and the slot lock the collar and the head against rotation, the head being rotatable between the first and second rotational positions upon movement of the collar against the bias to disengage the structure and slot.

In an added embodiment, the present invention provides a vegetation trimming and edging device comprising a head that supports a cutting element, a shaft, a neck portion defined by the head for receipt of the shaft, a collar mounted about the neck portion and about a portion of the shaft proximate the neck portion, the neck portion and collar being jointly rotatable about the shaft, a structure extending from one of the shaft and the collar, a slot defined-by one of the collar and the shaft for engagement with the structure to lock the collar and neck portion against rotation about the shaft, and a bias mechanism that biases the structure and slot into engagement with one another upon rotation of the collar and head to a first rotational position, the structure and the slot locking the collar and the head against rotation, the head being rotatable between the first and second rotational positions upon movement of the collar against the bias to disengage the structure and slot.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference numbers and designations in the various drawings indicate like elements.

DETAILED DESCRIPTION

Figure 1:
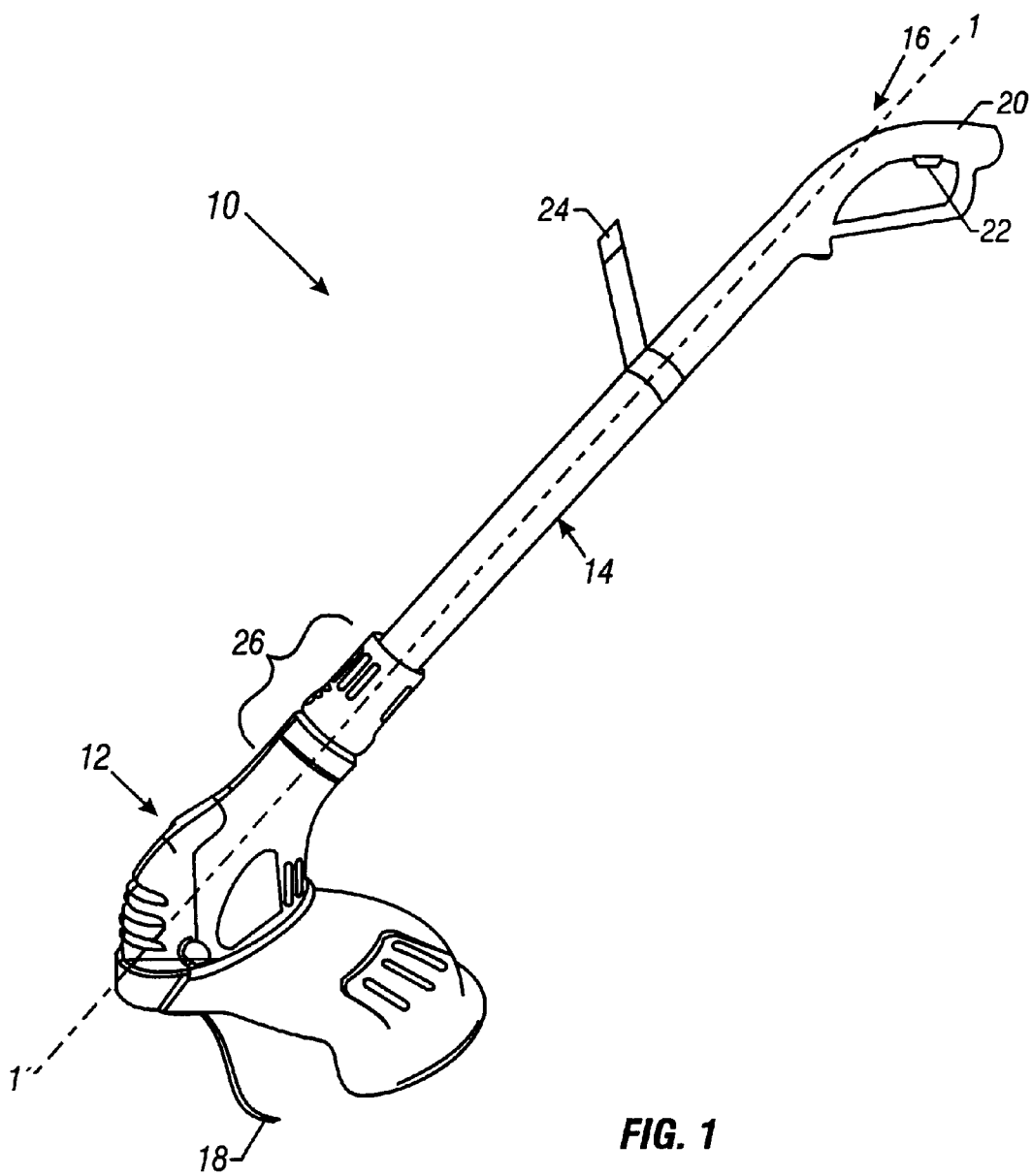
FIG. 1 is a perspective view of a vegetation trimming and edging device.

FIG. 1 is a perspective view of a vegetation trimming and edging device 10. As shown in FIG. 1, device 10 includes a head 12, a shaft 14, and a handle 16. Shaft 14 extends between head 12 and handle 16. In the example of FIG. 1, head 12 supports an electric motor and a cutting element 18, such as a string. In other embodiments, however, the motor could be housed at an end of device 10 opposite head 12, and coupled to the head and cutting element 18 by a drive shaft or linkage. A trimming and edging device 10 having a head-mounted motor will be described herein for purposes of illustration.

With further reference to FIG. 1, the motor has a rotor that drives cutting element 18 to trim or edge vegetation. Handle 16 provides a gripping member 20 for the operator, and includes a switch 22 that controls the operation of the motor housed in head 12. Handle 16 may house a power supply such as a battery or line power transformer for powering the motor in head 12. Electrical wiring extends between switch 22 and head 12 via an interior conduit defined by shaft 14 to deliver power to the motor. A second handle 24 can be mounted on shaft 14 to provide another gripping member for the operator. A coupling mechanism 26 couples head 12 to shaft 14. As will be described, coupling mechanism 26 permits rotation of head 12 about a longitudinal axis 1—1 defined by shaft 14. Specifically, coupling mechanism 26 permits rotation of head 12 between edging and trimming positions.

Figure 2:
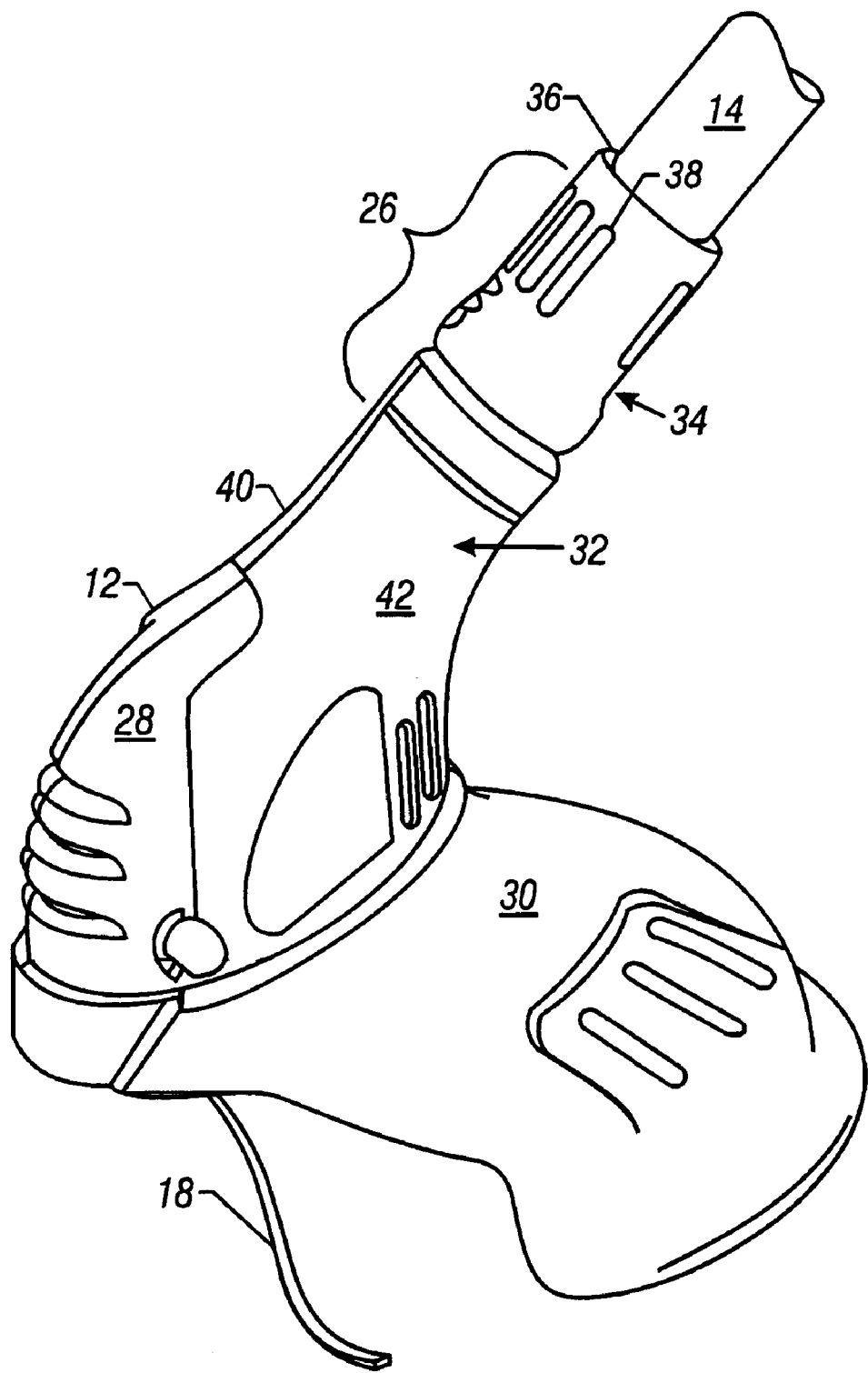
FIG. 2 is a perspective view of a head and shaft incorporating a coupling mechanism for a device as shown in FIG. 1.

FIG. 2 is a perspective view of head 12, shaft 14, and coupling mechanism 26 as shown in FIG. 1. Head 12 defines a housing 28, guard member 30, and neck portion 32, each of which can be manufactured from a plastic material such as ABS. Shaft 14 can be manufactured from a metal such as aluminum, and may take the form of a continuous shaft or a series of shaft sections. Guard member 30 shields the user from cutting member 18. Cutting member 18 is rotated by the electric motor housed in head 12. Neck portion 32 can be made substantially circular in cross-section, and tapers from a larger diameter proximate housing 28 to a narrower diameter proximate shaft 14. A collar 34 can be mounted about neck portion 32. Collar 34 and neck portion 32 define an opening 36 for receipt of one end of shaft 16, and together form part of coupling mechanism 26, which couples head 12 to the shaft.

Collar 34 may include a series of grooves 38 or other surface features that provide a gripping surface for the user. Collar 34 can be fixed to neck portion 32 such that head 12, the neck portion, and the collar move together, both in rotational and longitudinal directions relative to shaft 14. To provide a fixed relationship between neck portion 32 and collar 34, the collar can be attached to the neck portion using a variety of techniques such as adhesive bonding, ultrasonic welding, or the use of screws. Alternatively, collar 34 can be integrally molded with neck portion 32 and head 12. In a preferred embodiment, collar 34 can be held to neck portion 24 via snap fit engagement. Head 12 can be molded as two halves 40, 42, each of which incorporates one-half of housing 28 and neck portion 32. The two halves 40, 42 can be screwed, adhesively bonded, or ultrasonically welded together to form head 12. Guard member 30 can be attached to the molding housing 28 by similar techniques.

Figure 3:
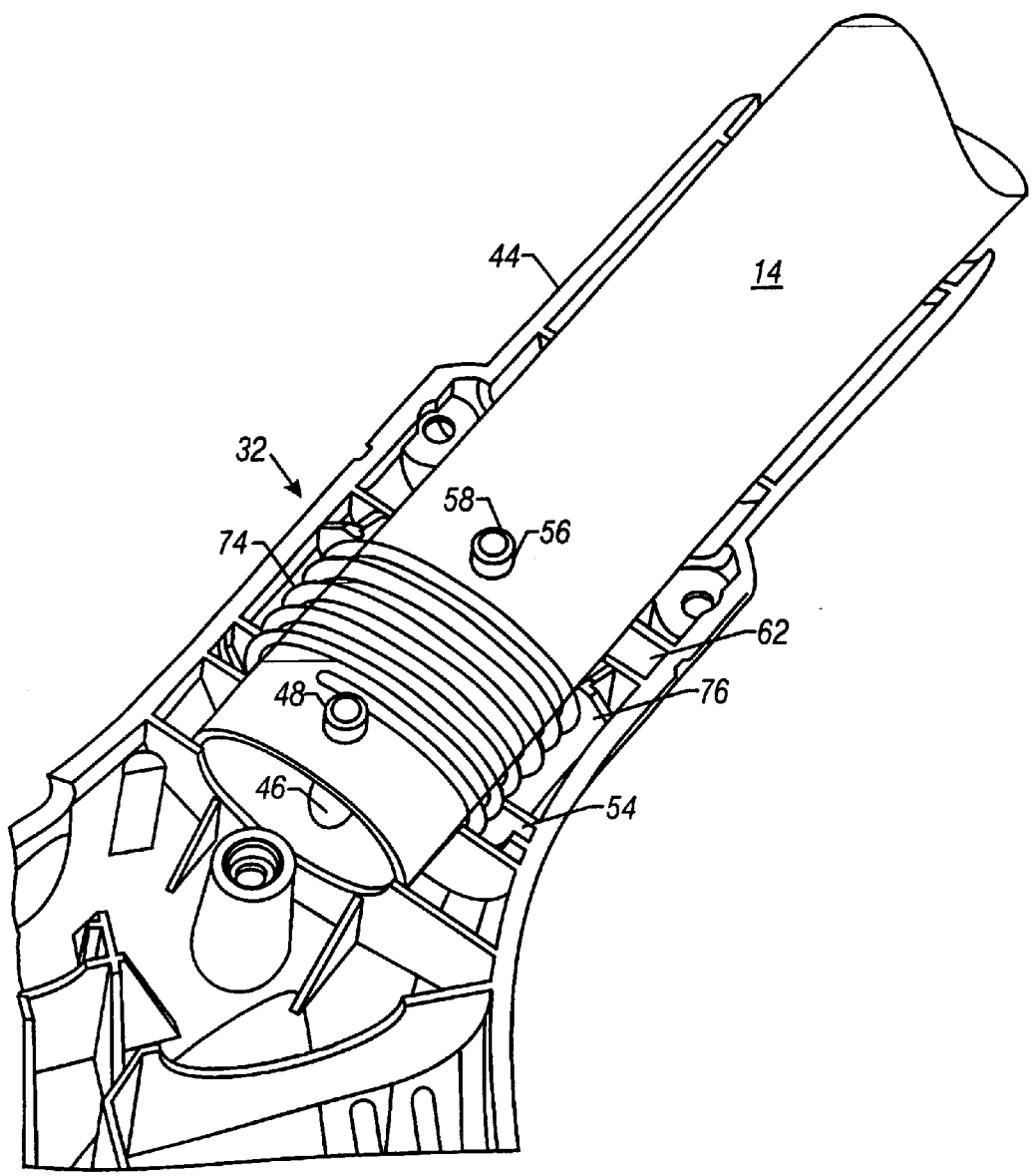
FIG. 3 is an interior view of part of a coupling mechanism as shown in FIG. 1.
Figure 4:
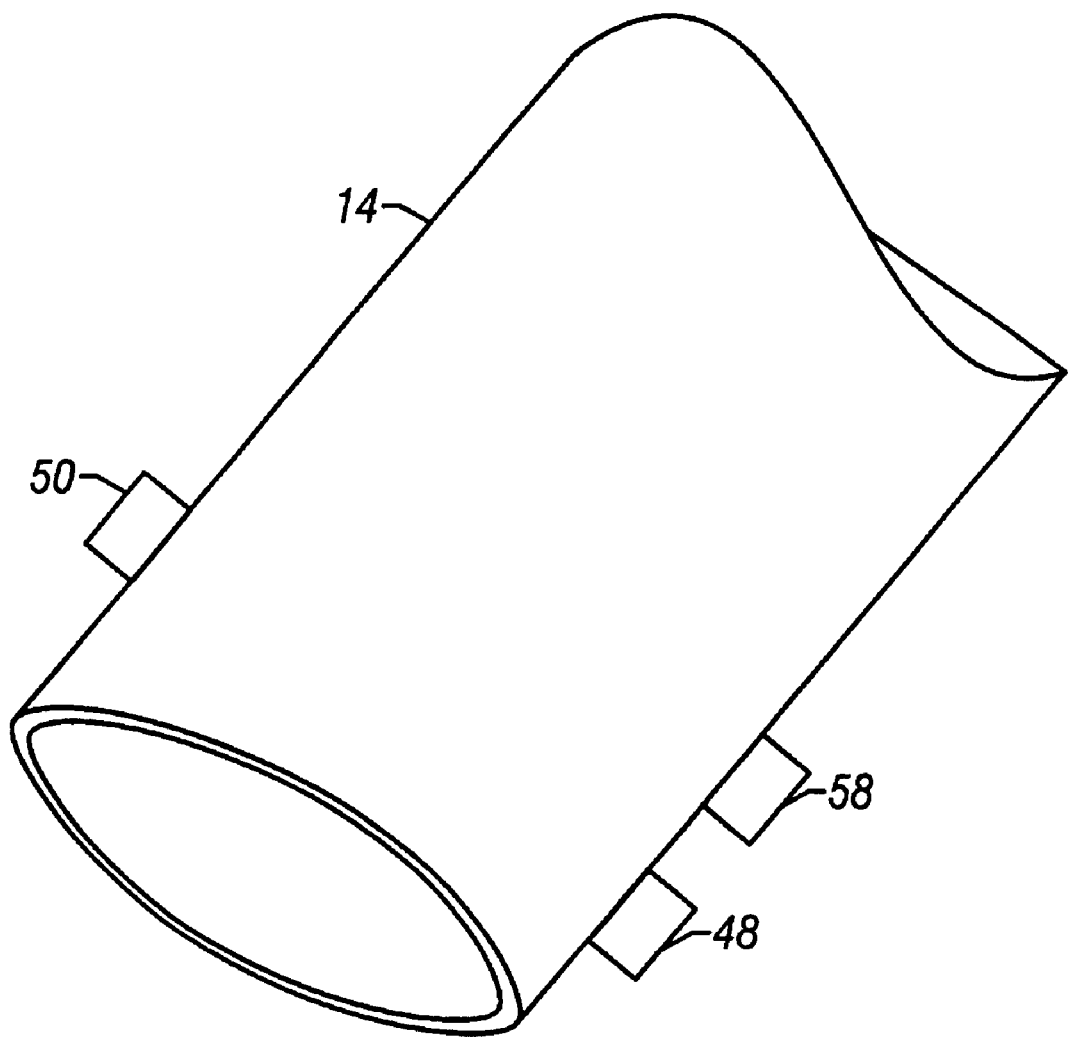
FIG. 4 is a perspective view of part of a shaft associated with the device of FIG. 1.

FIG. 3 is an interior view of part of coupling mechanism 26 as shown in FIG. 2. In particular, FIG. 3 shows a first half 40 of head 12 in conjunction with shaft 14. For clarity, collar 34 is not illustrated in FIG. 3. Upon assembly of halves 40, 42, collar 34 can be slipped over a portion 44 of neck portion 32. As shown in FIG. 3, coupling mechanism 26 includes a structure, e.g., in the form of a first pin 46, that extends radially outward from shaft 14. Pin 46 may extend through shaft 14 and protrude radially outward at opposite ends. FIG. 4 is a perspective view of shaft 14, illustrating pin 46 in greater detail. As shown in FIG. 4, pin 46 has first and second ends that form a first pin member 48 extending out one side of shaft 14 and a second pin member 50 extending out an opposite side.

With reference to FIGS. 3 and 4, a first track 54 defined by first half 40 of head 12 extends in a substantially circumferential direction relative to shaft 14. Track 54 continues along the interior of second half 42 of head 12 such that the track has an overall extent of approximately 360 degrees. First and second pin members 48, 50 are captured within track 54. Consequently, first and second pin members travel along track 54 during rotation of head 12 about the longitudinal axis defined by shaft 14. A second structure, e.g., a second pin 56, also extends radially outward from shaft 14. As shown in FIG. 4, second pin 56 forms only a first pin member 58 that travels along a second track 62 formed in first half 40 of head 12. Like track 54, track 62 continues along second half 42. In the example of FIG. 3, however, track 62 extends only 180 degrees about the internal circumference of neck portion 32. Second pin 56 can be formed, for example, by a rivet, and acts as a rotation stop, preventing rotation beyond the 180 degrees defined by track 62. In this manner, second pin 56 and track 62 prevent damage to the electrical cable extending through the interior of shaft 14 that otherwise could result from multiple full rotations of head 12. First and second pins 46, 56 act together to lock the head into two rotational positions for edging and trimming. Second pin 56, additionally, acts as the rotation stop. First and second pins 46, 56 also act to retain head 12 on shaft 14.

Figure 5:
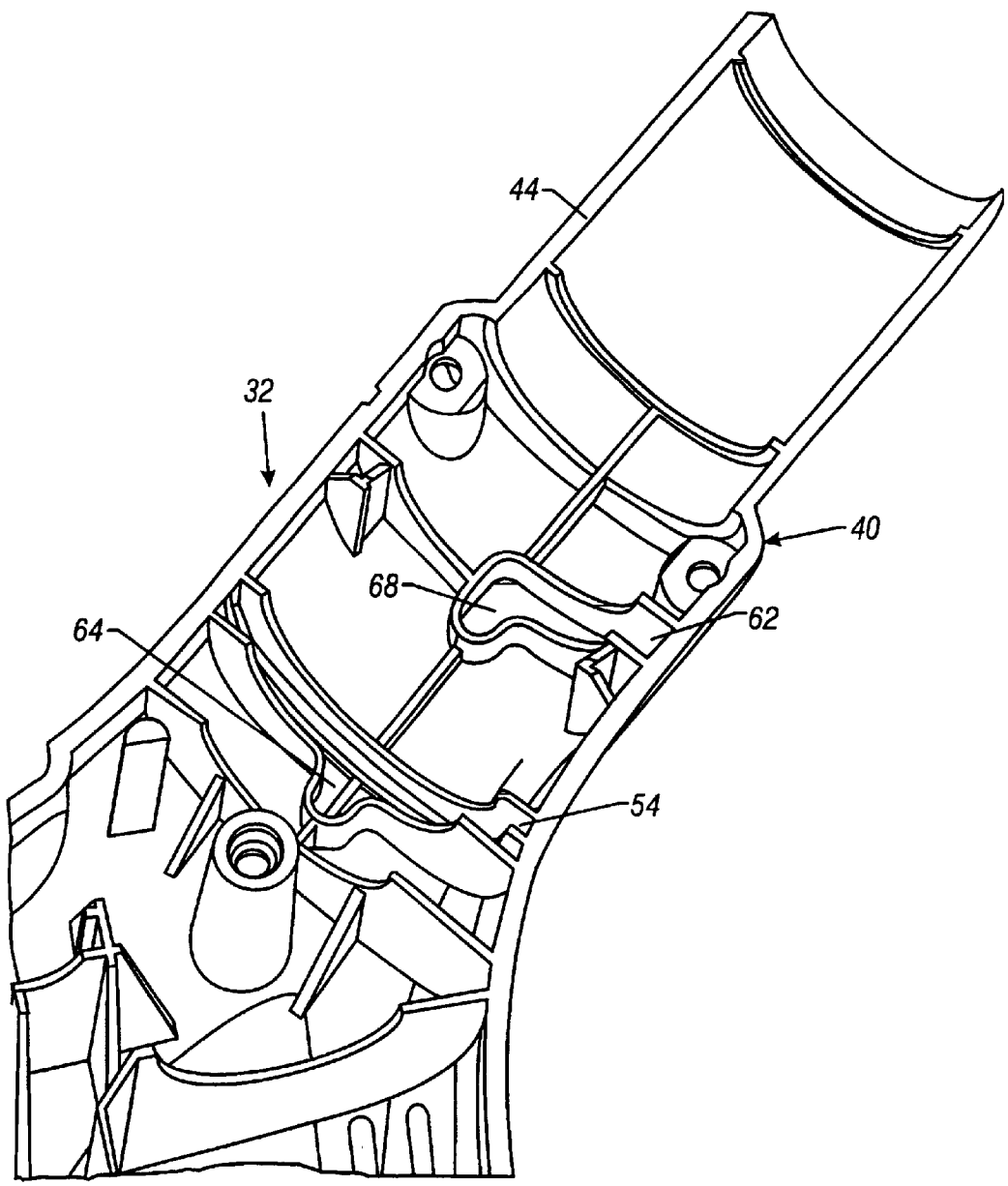
FIG. 5 is an interior view a first part of the coupling mechanism of FIG. 3.
Figure 6:
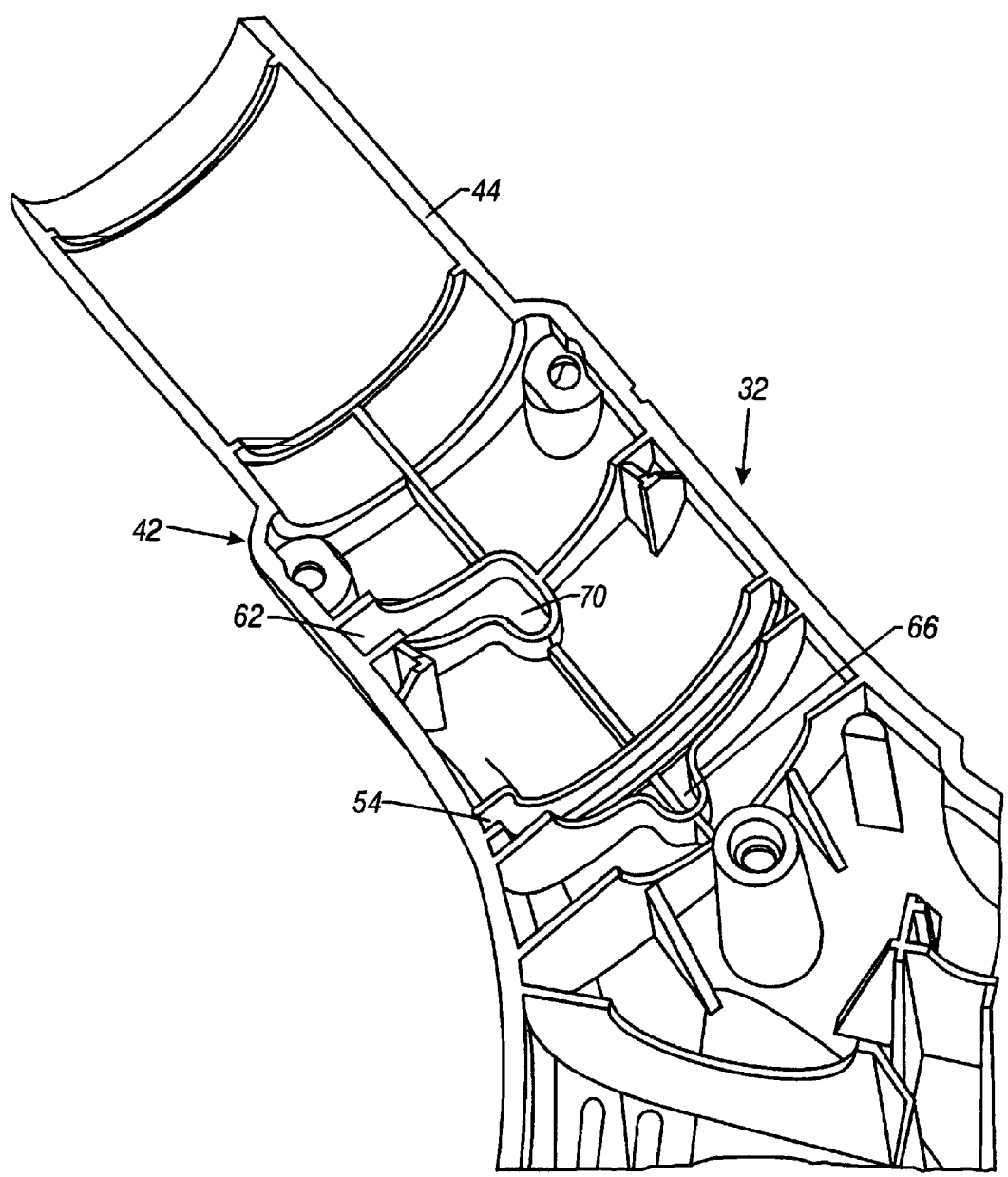
FIG. 6 is an interior view of a second part of the coupling mechanism of FIG. 3.

FIGS. 5 and 6 are additional interior views of part of the coupling mechanism shown in FIG. 3. FIG. 5 shows first half 40 of head 12, whereas FIG. 6 shows second half 42. For clarity, shaft 14 is not shown in FIGS. 5 and 6. FIGS. 5 and 6 illustrate tracks 54, 62 in greater detail. In particular, it is apparent that track 52 extends about the entire internal circumference of first half 40 and first half 42, i.e., 360 degrees. Track 62 extends for approximately 180 degrees about the internal circumference of first half 40 and second half 42. As further shown in FIGS. 5 and 6, first track 54 includes first and second slots 64, 66 for receipt of first or second pin member 48, 50. Similarly, second track 62 includes first and second slots 68, 70 for receipt of pin member 58. Slots 64, 66 are disposed approximately 180 degrees apart from another, as are slots 68, 70. In particular, each slot 64, 66, 68, 70 is disposed at a desired rotational position of head 12 that corresponds to either a trimming or edging operation.

The slots extend in a substantially perpendicular direction relative to the respective track 54, 62 and serve to capture pin members 48, 50, 58, and lock them against movement within the tracks. A bias mechanism biases the respective pin member 48, 50, 58 into engagement with one of the slots 64, 66, 68, 70 upon rotation of head 12 into one of the rotational positions. As shown in FIG. 3, for example, the bias mechanism may take the form of a compressed spring 74 that is mounted about shaft 14 between pin 46 and pin 56. Spring 74 bears against pin 46 at one end and against a flange surface 76 at the opposite end, tending to urge pin members 48, 50, 58 downward and into slots 64, 66, 68, 70 when they are brought into alignment.

When head 12 is rotated to the trimming position, for example, first pin member 48 engages slot 66 while second pin member 50 engages slot 64. When head 12 is rotated to the edging position, the arrangement is reversed, i.e., first pin member 48 engages slot 64 and second pin member 50 engages slot 66. In either case, the bias mechanism serves to urge the pin members 48, 50, 58 into slots 66, 68, 70, 72 and prevent travel of the pin members within tracks 46, 56. In this manner, slots 66, 68, 70, 72 lock head 12 against rotation. Head 12 is rotatable between the first and second rotational positions for trimming and edging, however, upon movement of pin members 48, 50, 58 against the bias and out of engagement with the respective slot 66, 68, 70, 72. Use of two tracks 46, 56 displaced at different longitudinal positions relative to shaft 14 provides added stability against rotation and twisting of shaft 14.

Thus, in operation, head 12 can be rotated by pushing downward on collar 34 to move the head away from shaft 14 and thereby compress spring 74. In this manner, the downward movement of head 12 urges pin members 48, 50, 58 out of engagement with slots 66, 68, 70, 72, as applicable.

While downward pressure is maintained, head 12 is then rotated about shaft 14 to either an edging or trimming position. When the proper rotational position is reached, and pin members 48, 50, 58 have come into alignment with respective slots 66, 68, 70, 72, downward pressure is relaxed. At this time, pin members 48, 50, 58 engage slots 66, 68, 70, 72 and lock head 12 against further rotational movement. Specifically, when head 12 is rotated to the edging position, pin members 48, 50, 58 engage slots 66, 68, 70, 72 oriented opposite those engaged in the trimming position. Head 12 is then ready for use in either a trimming or edging mode. This "push-and-turn" operation reduces the possibility that the head will unexpectedly rotate during use, e.g., due to contact between head 12 and the ground. A number of alternative arrangements to that shown in FIGS. 2–6 are conceivable. For example, tracks 54, 62 and slots 66, 68, 70, 72 could be formed in shaft 14, with pin members 48, 50, 58 extending inward from neck portion 32 to engage the tracks. In this case, slots 66, 68, 70, 72 could be oriented to extend upward from the respective track 54, 62. Spring 74 then would bias pin members 48, 50, 58 upward into engagement with slots 66, 68, 70, 72 to lock head 12 against rotation. Application of downward pressure to head 12 would disengage pin members 48, 50, 58 from slots 66, 68, 70, 72 to permit movement between trimming and edging positions.

As a further alternative, the rotation stop feature of pin member 58 could be replaced by a keyed structure on shaft 14 that abuts with a reciprocal structure on the interior of neck portion 32 to limit the extent of rotation of head 12. Another alternative arrangement could make use of a flared portion of shaft 14, i.e., a portion have an enlarged diameter that engages neck portion 32 to retain head 12. In this alternative, the exterior of the flared portion could be arranged to bear against spring 76, with pin member 58 locking head assembly 12 into rotational positions for edging and trimming and serving as a stop against rotation. In either of the above embodiments, the arrangement facilitates a push-and-turn operation in which the operator pushes head 12 downward relative to shaft 14, and turns the head to the desired rotational position for trimming or edging.

Figure 7:
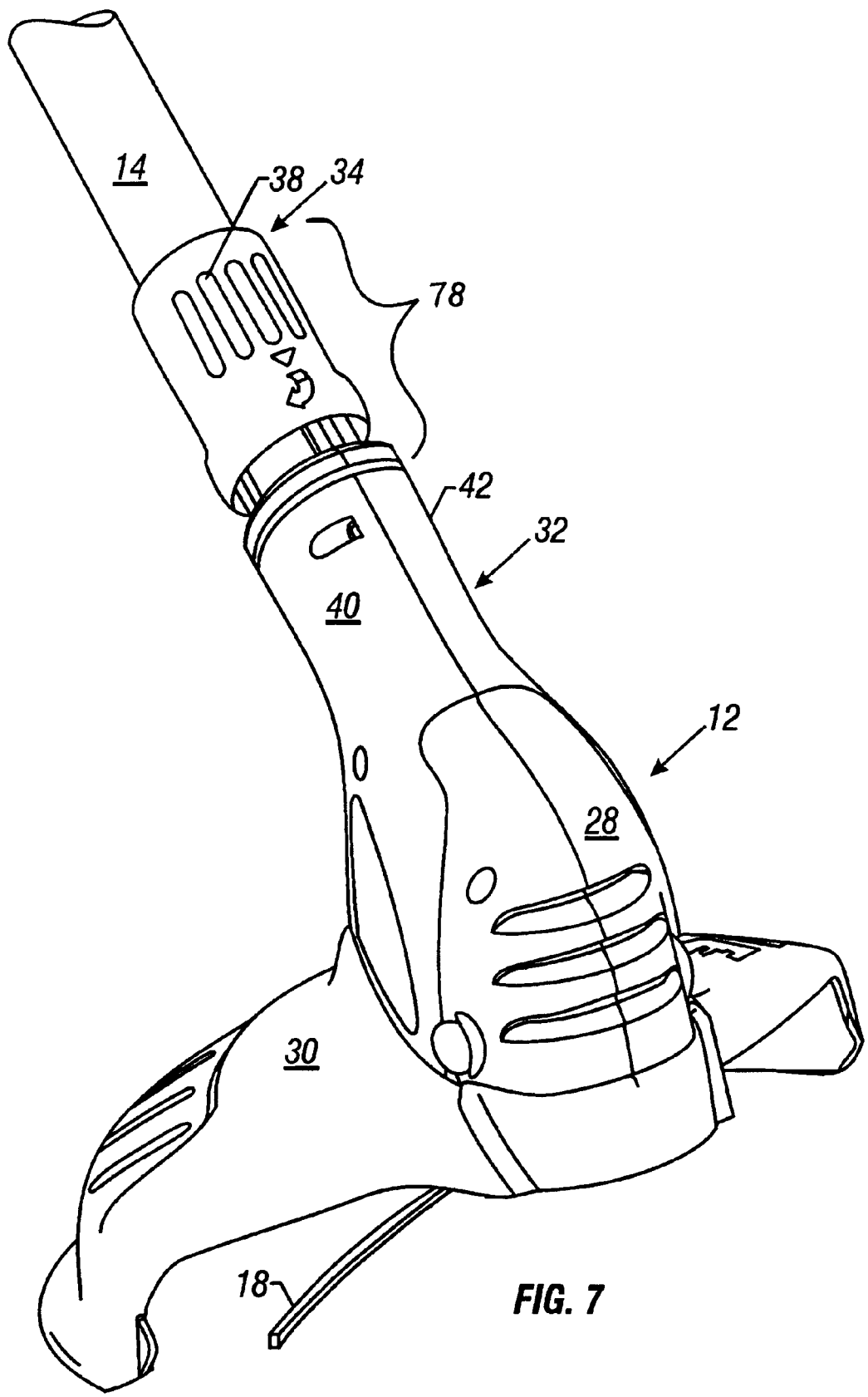
FIG. 7 is a perspective view of an alternative head and shaft assembly for a device as shown in FIG. 1.

FIG. 7 is a perspective view of an alternative head and shaft assembly for a vegetation trimming and edging device. The trimming and edging device may conform substantially to that shown in FIG. 1. For example, head 12 can be formed from two halves 40, 42 that are assembled together, and may include guard member 30 and neck portion 32. Neck portion 32 receives one end of shaft 14. In the embodiment of FIG. 7, however, the device includes an alternative coupling mechanism 78 that couples shaft 14 to head 12 and permits rotation of the head between trimming and edging positions. In particular, collar 34 is capable of limited axial movement along the longitudinal extent of shaft 14. Collar 34 and neck portion 32 can be reciprocally keyed, for example, such that the collar and neck portion are jointly rotatable about the shaft while enabling the collar to move longitudinally. As will be described, the collar 34 is biased into a locking position. In this manner, collar 34 can be used to lock and unlock head 12 for rotation. At the same time, however, the axial position of head 12 remains generally fixed relative to shaft 14. Instead, collar 34 is moved axially to facilitate rotation. Consequently, the possibility of unexpected rotation of head 12 due to contact with the ground is reduced.

Figure 8:
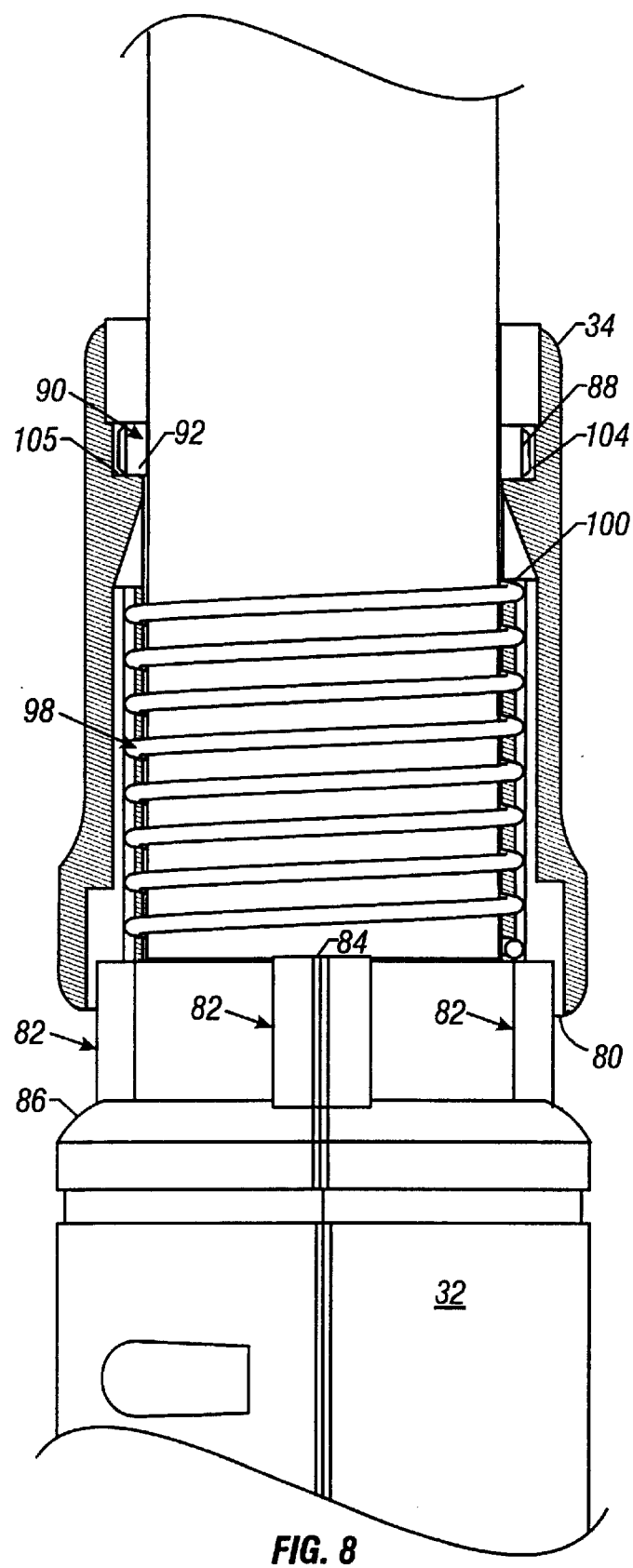
FIG. 8 is a cut-away view of a coupling mechanism associated with a head and shaft assembly as shown in FIG. 7.
Figure 9:
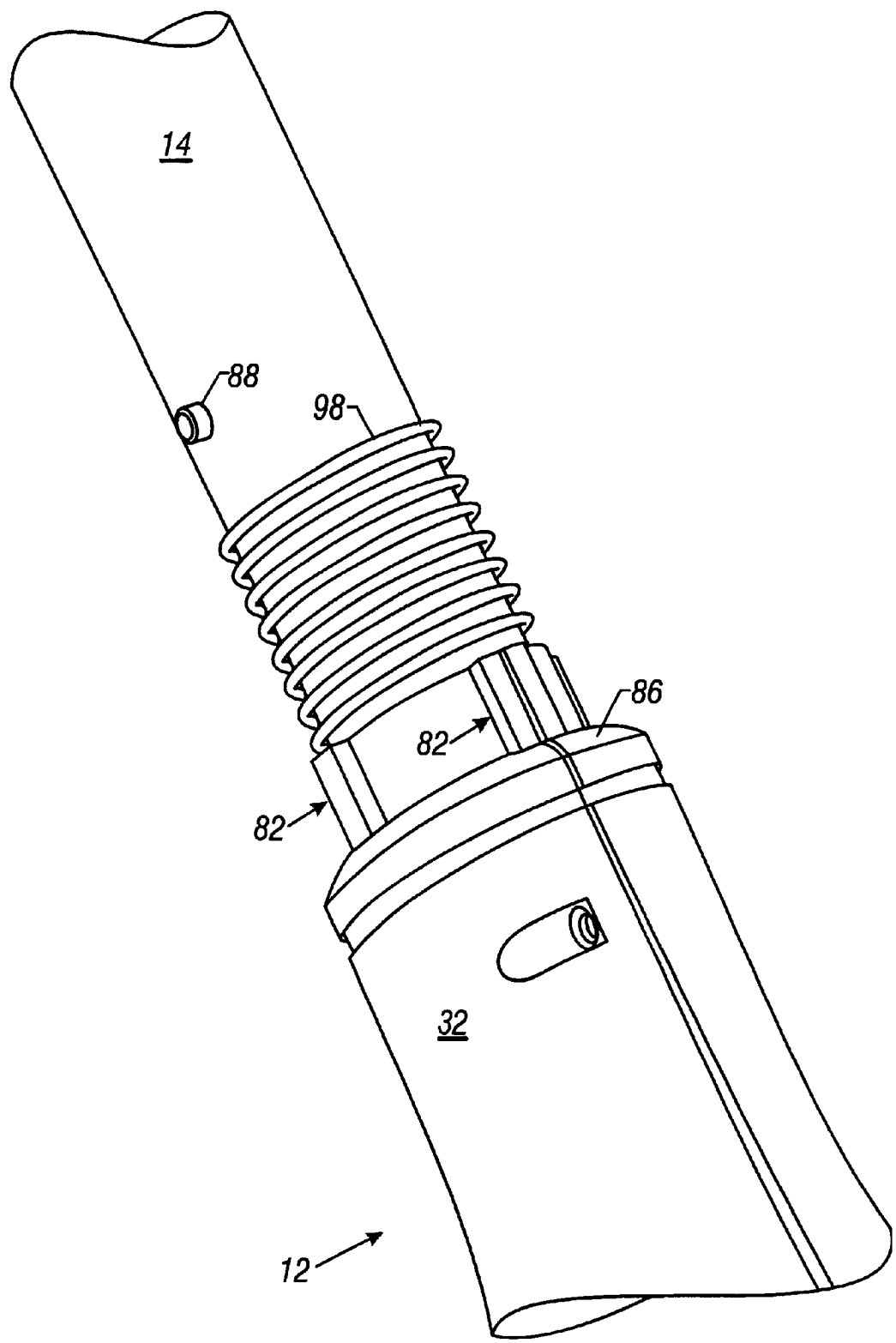
FIG. 9 is a perspective view of part of the coupling mechanism of FIG. 8.
Figure 11:
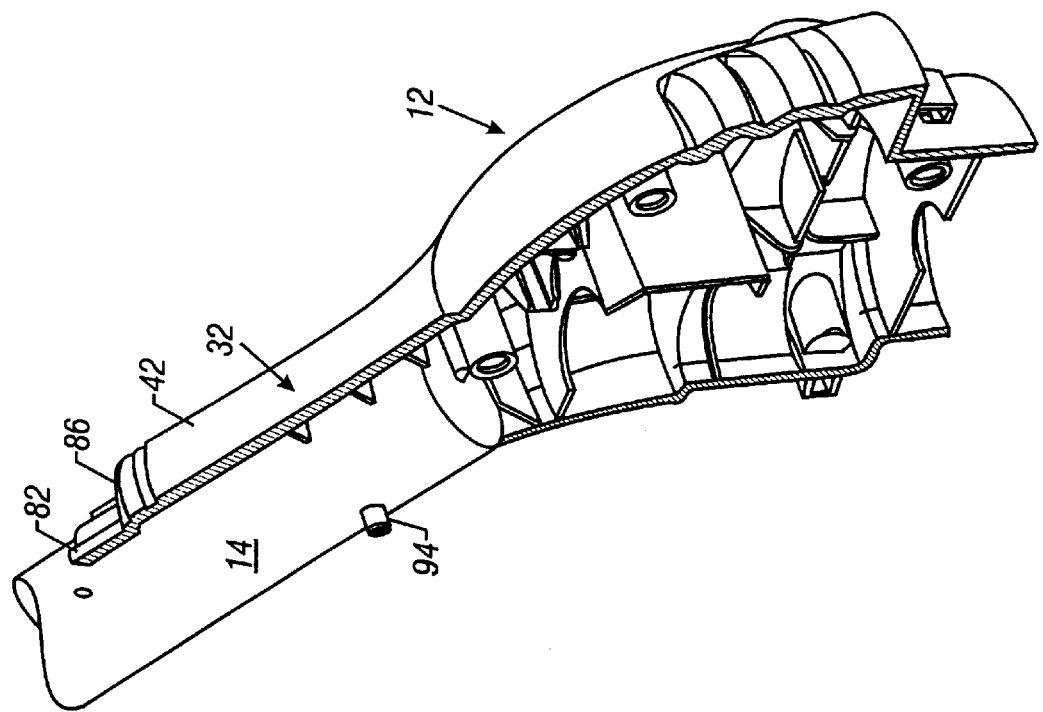
FIG. 11 is an interior view of a second section of the coupling mechanism of FIG. 8.
Figure 10:
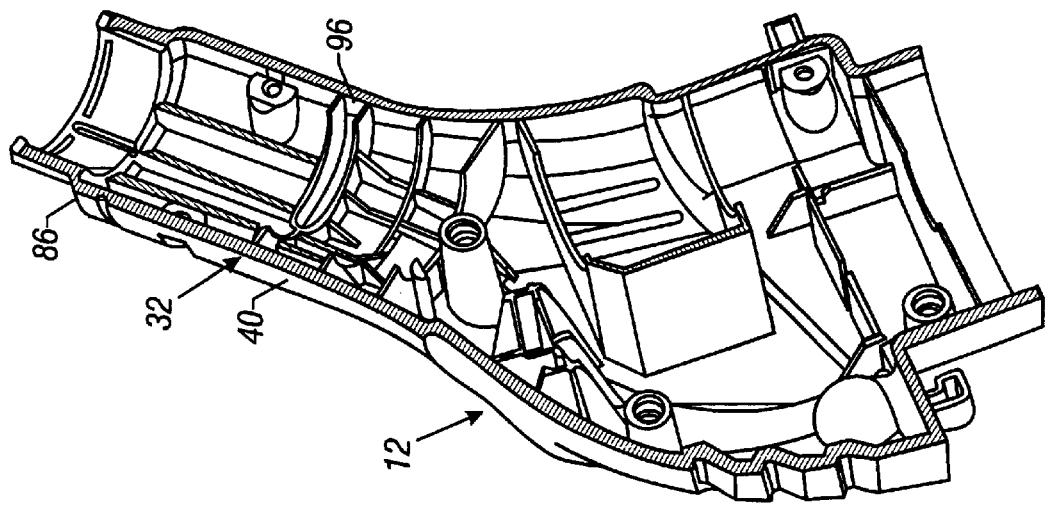
FIG. 10 is an interior view of a first section of the coupling mechanism of FIG. 8.
Figure 12:
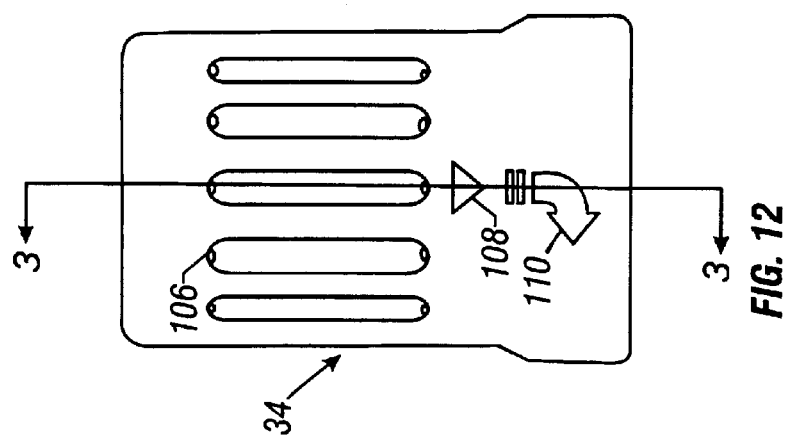
FIG. 12 is a side view of a collar forming part of the coupling mechanism of FIG. 7.
Figure 13:
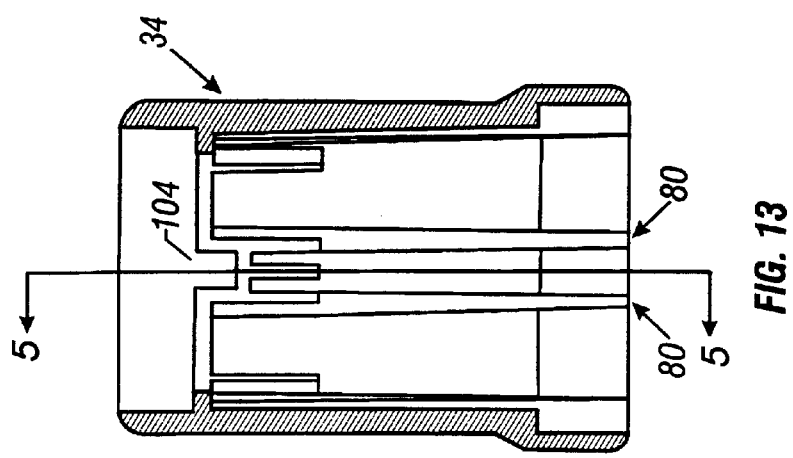
FIG. 13 is a sectional view of the collar of FIG. 12 taken along line 3—3.
Figure 14:
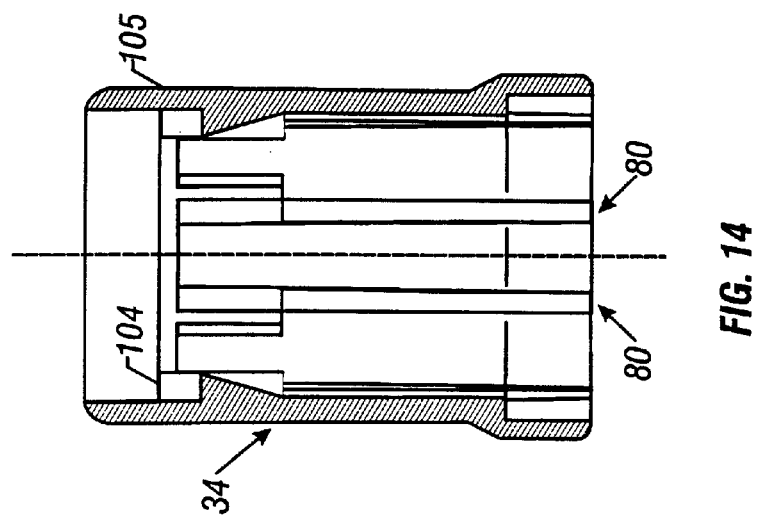
FIG. 14 is a sectional view of the collar of FIG. 13 taken along line 5—5.

FIG. 8 is a cut-away view of a coupling mechanism 78 associated with a device as shown in FIG. 7. FIG. 9 is a perspective view of part of coupling mechanism 78 with collar 34 removed. FIGS. 10 and 11 are interior views of first half 40 and second 42, respectively, of head 12. FIG. 11 further illustrates shaft 14. FIG. 12 is a side view of collar 34. FIGS. 13 and 14 are sectional views of collar 34 taken along line 3—3 in FIG. 12 and line 5—5 in FIG. 13, respectively. As shown in FIG. 8, collar 34 is mounted about neck portion 32 of head 12. Again, the trimming and edging device may include a motor at an end of shaft 14 opposite head 12, and coupled with a drive shaft or linkage. A device having a head-mounted motor will be described herein, however, for illustration.

Collar 34 has a keyed structure that engages a reciprocal keyed structure in neck portion 32. Specifically, collar 34 defines a number of ribs 80 distributed about its interior circumference. Each rib 80 engages one of a plurality of spline features 82, best shown in FIGS. 8 and 9, that are distributed about the circumference of neck portion 32. Ribs 80 are also shown in FIGS. 13 and 14. Each spline feature 82 defines a groove 84 that receives and retains one of ribs 80. In this manner, collar 34 and neck portion 32 must rotate together about shaft 14. Spline features 82 allow axial sliding of ribs 80, however, such that collar 34 can move in an axial direction along shaft 14.

The axial travel of collar 34 is limited. At one end, collar 34 abuts a flange surface 86 defined by neck portion 32. At the other end, first and second pin members 88, 90 formed by a pin that extends through shaft 14 engage a flange surface 92 defined by collar 34, as shown in FIG. 8. As best shown in FIGS. 10 and 11, shaft 14 includes another pin 94 that extends out of one side for engagement with a track 96 defined by the interior surface of neck portion 32. Pin 94 travels in rotational direction of head 12 along track 96. Track 96 extends about shaft 14 and the interior surface of neck portion 32 for about 180 degrees. This arrangement allows head 12 to rotate about shaft 14 for about 180 degrees. The ends of track 96 limit the rotation of head 12, however, to 180 degrees. At the same time, track 96 prevents head 12 from moving axially relative to shaft 14.

A compressed spring 98 mounted about shaft 14 bears at one end against a lip 100 that extends about the inner surface of collar 34, and at the other end against the spline features 82 formed by neck portion 32. Spring 98 biases collar 34 upward relative to head 12. In this manner, spring 98 and pin members 88, 90 act against collar 34 to bias and lock it against movement. As illustrated in FIGS. 8, 13, and 14, additional ribs 102 defined by collar 34 form slots 104, 105 that capture first and second pin members 88, 90. In particular, when slots 104, 105 and pin members 88, 90 are in alignment, spring 98 biases collar 34 upward such that the slots capture the pin members. Slots 104, 105 then serve to lock collar 34 against rotational movement. At the same time, with collar 34 and neck portion 32 coupled via ribs 80 and spline features 82, head 12 also is locked against rotational movement.

Pin members 88, 90 are aligned with rotational positions corresponding to trimming and edging modes. Thus, when slots 104 engage pin members 88, 90, head 12 is locked for operation in the desired mode. When the user desires to select the other mode, collar 34 is pushed downward relative to head 12 against the spring bias provided by spring 98. Upon downward movement of collar 34, pin members 88, 90 are released from slots 104, 105, enabling rotation of collar 34 and corresponding rotation of head 12. Pin 94 and track 96, as shown in FIGS. 10 and 11, limit the rotational extent of head 12, but permit rotation from a trimming position to an edging position, and vice versa. Once the desired position is reached, the downward pressure on collar 34 is released, allowing pin members 88, 90 to engage slots 104 and lock head 14. As shown in FIG. 12, collar 34 may include grooves 106 or other gripping features, as well as indicia of the movement required for adjustment. In particular, collar may include a down arrow 108 and a curved arrow 110 indicative of the application of downward pressure followed by rotational movement.

As an alternative arrangement to that shown in FIGS. 7–14, slots 104, 105, as well as track 96, could be formed in shaft 14, with pin members 88, 90 and pin 94 extending inward from neck portion to engage the slots and tracks, respectively. In this case, slots 104, 105 could be oriented to extend upward. Spring 76 then would bias pin members 88, 90 upward into engagement with slots 104, 105 to lock head 12 against rotation. Application of downward pressure to head 12 would disengage pin members 88, 90 from slots 104, 105 to permit movement between trimming and edging positions.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A vegetation trimming and edging device comprising:
 a cutting element;
 a motor that drives the cutting element;
 a head that supports the motor and the cutting element;
 a handle;
 a shaft extending between the head and the handle; and
 a coupling mechanism that couples the shaft to the head, the coupling mechanism including:
  a neck portion defined by the head for receipt of the shaft;
  a collar mounted about the neck portion and about a portion of the shaft proximate the neck portion, the neck portion and collar having a keyed structure such that the collar and neck portion are jointly rotatable about the shaft;
  a structure extending from one of an exterior surface of the shaft and an interior surface of the collar,
  a slot defined by one of the collar and the shaft for engagement with the structure to lock the collar and neck portion against rotation about the shaft, and
  a bias mechanism that biases the structure and slot into engagement with one another upon rotation of the collar and head to a first rotational position, wherein the structure and the slot lock the collar and the head against rotation, the head being rotatable between the first rotational position and a second rotational position upon movement of the collar against the bias to disengage the structure and the slot.

2. The device of claim 1, wherein the structure includes a first pin member and a second pin member, the first pin member engaging the slot when the head is in the first rotational position to thereby lock the head against rotation, and the second pin member engaging the slot when the head is in a second rotational position to thereby lock the head against rotation.

3. The device of claim 1, wherein the slot includes first slot and a second slot, the first slot engaging the structure when the head is in the first rotational position to thereby lock the head against rotation, and the second slot engaging the structure when the head is in a second rotational position to thereby lock the head against rotation.

4. The device of claim 1, wherein the slot includes a first slot and a second slot and the structure includes a first pin member and a second pin member, the first slot engaging the first pin member and second slot engaging the second pin member when the head is in the first rotational position to thereby lock the head against rotation, and the second slot engaging the first pin member and the first slot engaging the second pin member when the head is in a second rotational position to thereby lock the head against rotation.

5. The device of claim 1, wherein the bias mechanism includes a compressed spring that bears against the collar and the head to urge the structure and slot into engagement with one another.

6. The device of claim 1, wherein the head defines an enclosure that partially encloses the motor.

7. The device of claim 1, wherein the cutting element includes a string coupled to the motor, the motor driving the string through a rotational plane.

8. A coupling mechanism for coupling a shaft to a head in a vegetation trimming and edging device, the coupling mechanism comprising:
 a neck portion defined by the head for receipt of the shaft,
 a collar mounted about the neck portion and about a portion of the shaft proximate the neck portion, the neck portion and collar having a keyed structure such that the collar and neck portion are jointly rotatable about the shaft;
 a structure extending from one of an exterior surface of the shaft and an interior surface of the collar,
 a slot defined by one of the collar and the shaft for engagement with the structure to lock the collar and neck portion against rotation about the shaft, and
 a bias mechanism that biases the structure and slot into engagement with one another upon rotation of the collar and head to a first rotational position, wherein the structure and the slot lock the collar and the head against rotation, the head being rotatable between the first rotational position and a second rotational position upon movement of the collar against the bias to disengage the structure and slot.

9. The coupling mechanism of claim 8, wherein the structure includes a first pin member and a second pin member, the first pin member engaging the slot when the head is in the first rotational position to thereby lock the head against rotation, and the second pin member engaging the slot when the head is in a second rotational position to thereby lock the head against rotation.

10. The coupling mechanism of claim 8, wherein the slot includes first slot and a second slot, the first slot engaging the structure when the head is in the first rotational position to thereby lock the head against rotation, and the second slot engaging the structure when the head is in a second rotational position to thereby lock the head against rotation.

11. The coupling mechanism of claim 8, wherein the slot includes a first slot and a second slot and the structure includes a first pin member and a second pin member, the first slot engaging the first pin member and the second slot engaging the second pin member when the head is in the first rotational position to thereby lock the head against rotation, and the second slot engaging the first pin member and the first slot engaging the second pin member when the head is in a second rotational position to thereby lock the head against rotation.

12. The coupling mechanism of claim 8, wherein the bias mechanism includes a compressed spring that bears against the collar and the head to urge the structure and slot into engagement with one another.

13. The coupling mechanism of claim 8, wherein the head defines an enclosure that partially encloses the motor.

14. The coupling mechanism of claim 8, wherein the cutting element includes a string coupled to the motor, the motor driving the string through a rotational plane.

15. A vegetation trimming and edging device comprising:

a head that supports a cutting element;

a shaft;

a neck portion defined by the head for receipt of the shaft, a collar mounted about the neck portion and about a portion of the shaft proximate the neck portion, the neck portion and collar being jointly rotatable about the shaft;

a structure extending from one of the shaft and the collar;

a slot defined defined by one of the collar and the shaft for engagement with the structure to lock the collar and neck portion against rotation about the shaft; and a bias mechanism that biases the structure and slot into engagement with one another upon rotation of the collar and head to a first rotational position, the structure and the slot locking the collar and the head against rotation, the head being rotatable between the first rotational position and a second rotational position upon movement of the collar against the bias to disengage the structure and the slot.

\* \* \* \* \*